United States Patent
Ohguro (10) Patent No.: US 7,567,730 B2
(45) Date of Patent: Jul. 28, 2009

(54) DETECTING AN ORIENTATION OF CHARACTERS IN A DOCUMENT IMAGE

(75) Inventor: Yoshihisa Ohguro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 295 days.

(21) Appl. No.: 11/375,130

(22) Filed: Mar. 15, 2006

(65) Prior Publication Data

US 2006/0210195 A1    Sep. 21, 2006

(30) Foreign Application Priority Data

Mar. 17, 2005  (JP)  ............................. 2005-077879

(51) Int. Cl.
*G06K 9/36* (2006.01)
(52) U.S. Cl. ...................... 382/290; 382/190
(58) Field of Classification Search ................ 382/181, 382/190, 290
See application file for complete search history.

(56) References Cited

U.S. PATENT DOCUMENTS

| | | | | |
|---|---|---|---|---|
| 4,926,490 A | * | 5/1990 | Mano | ........................ 382/177 |
| 5,031,225 A | * | 7/1991 | Tachikawa et al. | .......... 382/185 |
| 6,577,763 B2 | * | 6/2003 | Fujimoto et al. | ............. 382/199 |
| 6,804,414 B1 | * | 10/2004 | Sakai et al. | .................. 382/289 |
| 2004/0161149 A1 | * | 8/2004 | Kaneda et al. | ............. 382/181 |
| 2005/0027511 A1 | * | 2/2005 | Ohguro | ......................... 704/9 |
| 2006/0018544 A1 | * | 1/2006 | Ohguro | ...................... 382/181 |

FOREIGN PATENT DOCUMENTS

| | | |
|---|---|---|
| JP | 5-012960 | 2/1993 |
| JP | 05-205103 | 8/1993 |
| JP | 2000-067156 | 3/2000 |

OTHER PUBLICATIONS

Chinese Office Action corresponding to Chinese Patent Application No. 200610067618.5 with English language translation.

* cited by examiner

*Primary Examiner*—Samir A. Ahmed
*Assistant Examiner*—Stephen R Koziol
(74) *Attorney, Agent, or Firm*—Dickstein Shapiro LLP (57) ABSTRACT

An apparatus, method, system, computer program and product, each capable of detecting an orientation of characters in a document image are disclosed. The orientation of the characters is determined based on a detection result, which indicates the degree of similarity between a character line of the document image having a selected orientation and trained data of the upright position.

16 Claims, 10 Drawing Sheets

| TRIGRAM | P (Wi|Wi-2, Wi-1) | IN (P (Wi|Wi-2, Wi-1)) * (-1000) |
|---|---|---|
| [s013, s045, s032] | 1.00000 ( 1/ 1) | 0 |
| [s013, s064, s033] | 0.75000 ( 3 /4) | 287 |
| [s015, s005, s221] | 0.23077 ( 6/26) | 1466 |
| [s016, s145, s203] | 1.00000 ( 2/ 2) | 0 |
| [s134, s002, s102] | 0.20896 (14/67) | 1565 |
| [s134, s095, s244] | 1.00000 ( 1/ 1) | 0 |
| [s137, s187, s105] | 0.50000 ( 1/ 2) | 693 |
| [s138, s076, s228] | 0.01923 ( 1/52) | 3951 |
| [s140, s097, s003] | 0.04348 ( 1/23) | 3135 |
| [s141, s045, s013] | 0.04478 ( 3/67) | 3106 |
| . . . | | |

→ s021, s124, s032, sSPC, s048, s012, ...

DETECTING AN ORIENTATION OF CHARACTERS IN A DOCUMENT IMAGE

FIELD OF THE INVENTION

The following disclosure relates generally to an apparatus, method, system, computer program and product, each capable of detecting an orientation of characters in a document image.

DESCRIPTION OF THE RELATED ART

The existing image processing apparatus can detect an orientation of a document image based on a character contained in the document image. However, a type of the character is usually not known. Thus, in order to correctly detect the orientation of the document image, the existing image processing apparatus needs to store a large amount of reference document images for a number of languages and for each of its orientations. Consequently, the existing apparatus requires a large amount of storage. Further, since the existing image processing apparatus needs to compare the document image with each one of the reference document images, the process of detecting the orientation of the document image is time consuming. Therefore, there is a need for an image processing apparatus that is less cumbersome and can function more efficiently and effectively.

BRIEF SUMMARY OF THE INVENTION

Exemplary embodiments of the present invention include an apparatus, method, system, computer program and product, each capable of detecting an orientation of characters in a document image.

In one example, at least one character line is extracted from an input document image. The character line is rotated by a predetermined degree to have a selected orientation. The character line having the selected orientation is converted to a first set of symbols. Trained data, which is generated based on a reference document image having an upright position, is obtained. The degree of similarity between the character line having the selected orientation and the trained data of the upright position is detected to generate a detection result for the character line. Based on the detection result, an orientation of the input document image is determined.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

In describing the preferred embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an image processing apparatus 100 according to an exemplary embodiment of the present invention.

The image processing apparatus 100 is capable of detecting an orientation of characters in a portion of or entire document image.

Figure 1:
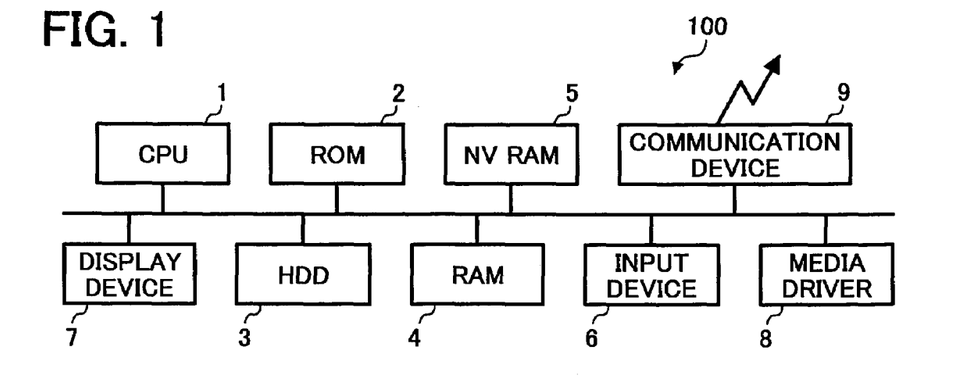
FIG. 1 is a schematic block diagram illustrating the structure of an image processing apparatus according to an exemplary embodiment of the present invention.

As shown in FIG. 1, the image processing apparatus 100 includes a central processing unit (CPU) 1, read only memory (ROM) 2, non-volatile random access memory (NVRAM) 5, communication device 9, display device 7, hard disk drive (HDD) 3, random access memory (RAM) 4, input device 6, and media driver 8, which are connected via a bus.

The CPU 1 controls entire operation of the image processing apparatus 100.

The HDD 3 stores various kinds of data, including a document image input to the image processing apparatus 100 in various ways. For example, the document image may be obtained by scanning a document using a scanner. The scanner may be incorporated in or coupled to the image processing apparatus 100. In another example, the document image may be generated by the image processing apparatus 100 using a word processing program stored in the ROM 2. In another example, the document image may be received through the communication device 9 from a communication line or a network. In another example, the document image may be read out from the HDD 3.

In this example, the HDD 3 additionally stores various computer programs including an operating system program such as Windows or Unix, or various application programs including an orientation detecting program of the present invention.

The ROM 2 stores a computer program, which causes the CPU 1 to load one or more computer programs stored in the HDD 3 onto the RAM 4. The RAM 4 functions as a work area of the CPU 1. For example, the RAM 4 deploys the document image obtained from the HDD 3 for further processing.

The NVRAM 5 stores trained data, which is trained on one or more kinds of reference document images each having an orientation of 0 degree from the upright position.

In this example, the NVRAM 5 stores three kinds of trained data including a first kind, a second kind, and a third kind. The first kind of trained data is trained on a plurality of characters contained in a horizontal character line extracted from an Asian reference document image placed in the upright position. The second kind of trained data is trained on a plurality of characters contained in a vertical character line extracted from an Asian reference document image placed in the upright position. The third kind of trained data is trained on a plurality of characters contained in a horizontal character line extracted from a Latin reference document image placed in the upright position. In this example, the Asian reference document image includes characters from any one of the Asian languages including Japanese, Korean, and Chinese. The Latin reference document image includes characters from any one of the Latin languages including English, French, Spanish, German, and Italian. However, the Asian reference document image or the Latin reference document image can include characters from any other language as long as the characters are similar in layout information as described below referring to FIGS. 9A and 9B.

The input device 6 includes any kind of device allowing a user to input various data, such as a keyboard or a mouse.

The display device 8 includes any kind of device capable of displaying various data, such as a liquid crystal display.

The media driver 8 includes any kind of device capable of reading data from a storage medium. Examples of storage mediums include, but are not limited to, flexible disk, hard disk, optical discs, magneto-optical discs, magnetic tapes, involatile memory cards, ROM (read-only-memory), etc. The storage medium may also store any one of computer programs to be used by the CPU 1.

The communication device 9 includes any kind of device capable of connecting the image processing apparatus 100 to the communication line or the network such as the Internet or a local area network (LAN). The communication device 9 may cause the image processing apparatus 100 to download or upload data from or to the network.

Figure 2:
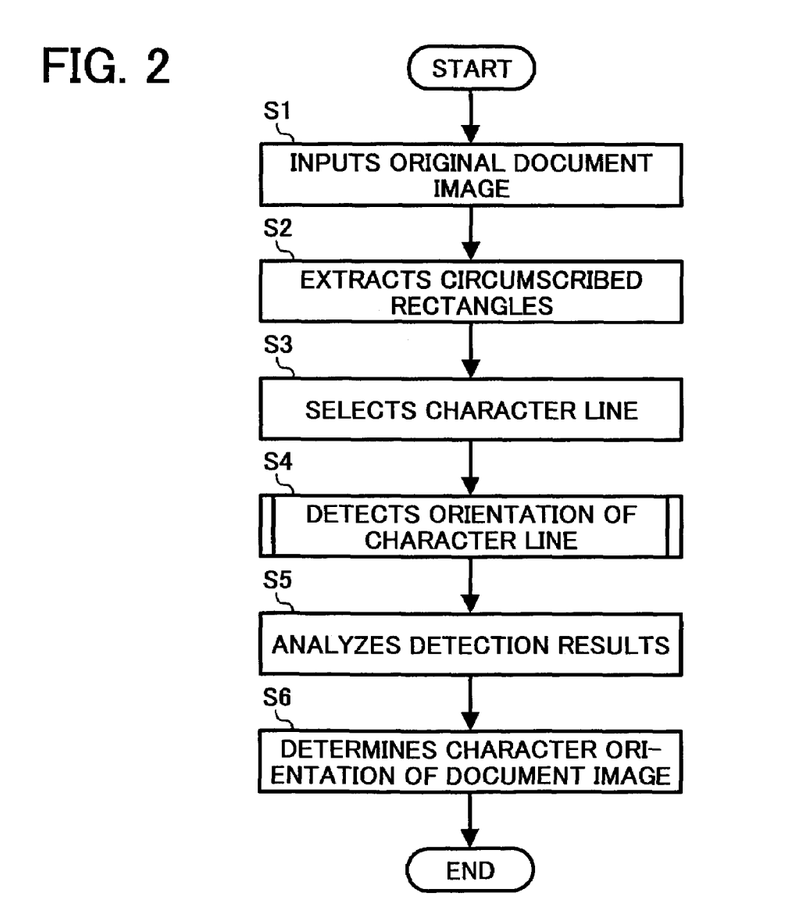
FIG. 2 is a flowchart illustrating operation of detecting an orientation of characters in a document image, performed by the image processing apparatus of FIG. 1, according to an exemplary embodiment of the present invention.

Referring now to FIG. 2, operation of detecting an orientation of characters in a document image is explained according to an exemplary embodiment of the present invention. The steps illustrated in FIG. 2 are performed by the CPU 1 when command data is input by a user using the input device 6.

Figure 3:
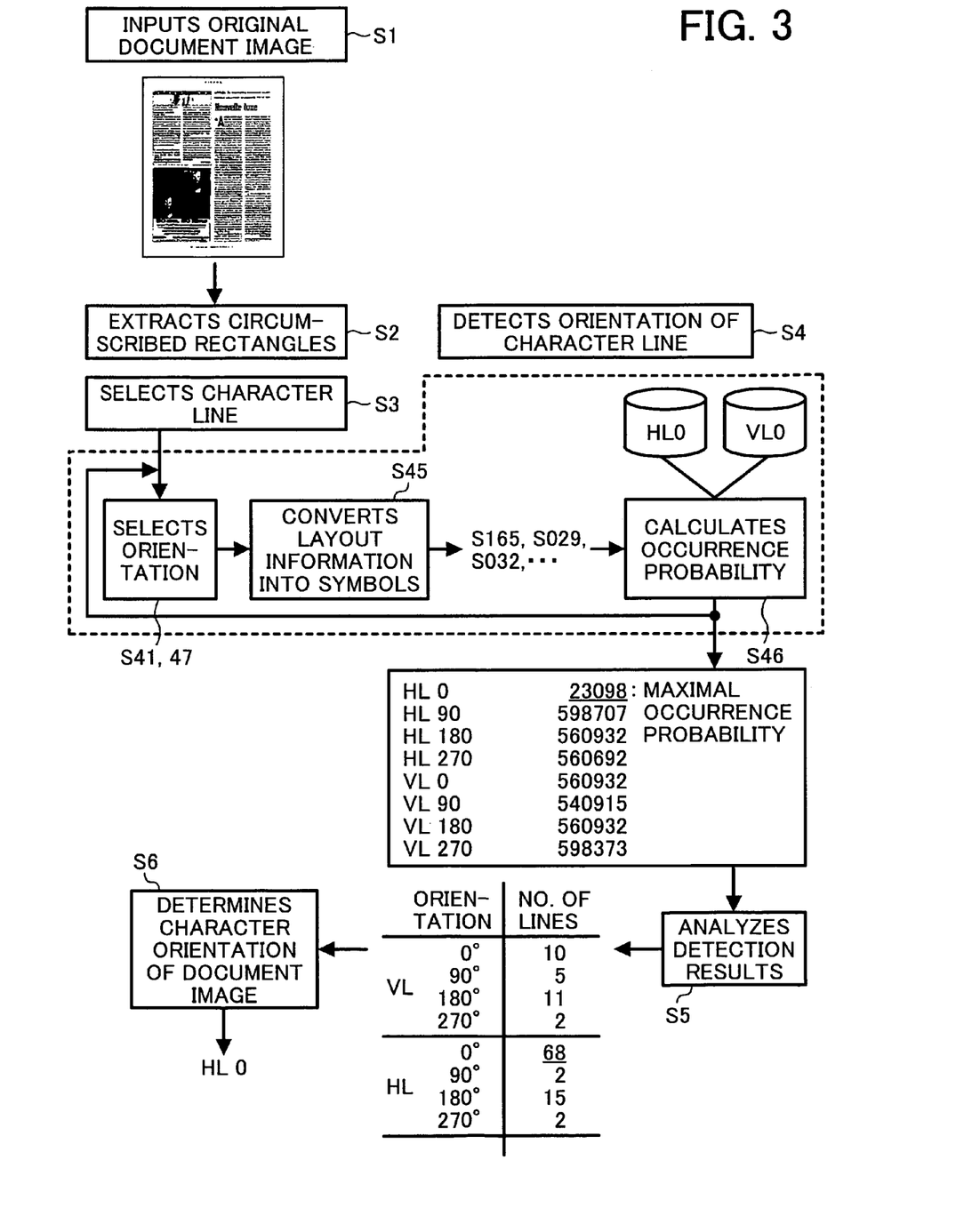
FIG. 3 is an illustration for explaining operation of detecting an orientation of characters in a document image, performed by the image processing apparatus of FIG. 1, according to an exemplary embodiment of the present invention.

Step S1 inputs a document image. The document image has a plurality of characters as shown in FIG. 3. In this example, the characters in the document image include Japanese characters and English characters. However, the document image may include any character of any language. Further, the document image may be a compressed image, which has a resolution lower than the resolution of the original document image.

Step S2 extracts one or more circumscribed rectangles for each one of the characters in the document image using any one of the known character recognition methods. Further, Step S2 forms one or more character lines based on the extracted circumscribed rectangles. For example, the CPU 1 extracts a run of black pixels and forms a minimal circumscribed rectangle (hereinafter, referred to as the "circumscribed rectangle") based on the extracted run. The circumscribed rectangles that are located closely are grouped into a character line.

Figure 4A:
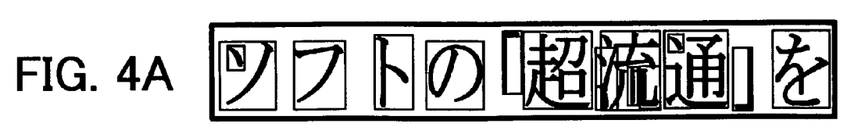
FIG. 4A is an illustration of an example horizontal character line extracted from a document image having a horizontal character line rotated by 0 degree from the upright position.
Figure 4B:
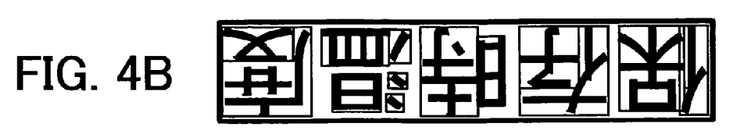
FIG. 4B is an illustration of an example horizontal character line extracted from a document image having a horizontal character line rotated by 180 degrees from the upright position.
Figure 4C:
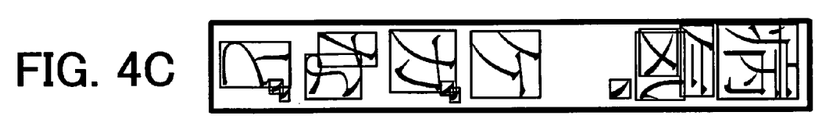
FIG. 4C is an illustration of an example horizontal character line extracted from a document image having a vertical character line rotated by 90 degrees from the upright position.
Figure 4D:
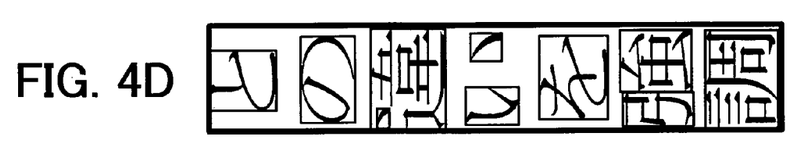
FIG. 4D is an illustration of an example horizontal character line extracted from a document image having a vertical character line rotated by 270 degrees from the upright position.

At this time, the orientation of the characters in the document image is not identified. If the circumscribed rectangles are formed into a horizontal character line, four kinds of orientations may be assumed for the characters in the extracted character line, as illustrated in FIGS. 4A to 4D. As shown in FIG. 4A, the extracted horizontal character line may contain a plurality of characters having an orientation of 0 degree from the upright position, which originally belongs to a horizontal character line ("HL0"). As shown in FIG. 4B, the extracted horizontal character line may contain a plurality of characters having an orientation of 180 degrees from the upright position, which originally belongs to a horizontal character line ("HL 180"). As shown in FIG. 4C, the extracted horizontal character line may contain a plurality of characters having an orientation of 90 degrees from the upright position, which originally belongs to a vertical character line ("VL 90"). As shown in FIG. 4D, the extracted horizontal character line may contain a plurality of characters having an orientation of 270 degrees from the upright position, which originally belongs to a vertical character line ("VL 270").

Figure 5A:
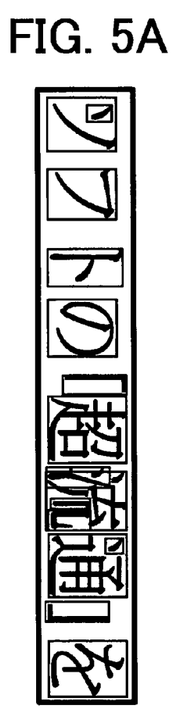
FIG. 5A is an illustration of an example vertical character line extracted from a document image having a horizontal character line rotated by 90 degrees from the upright position.
Figure 5B:
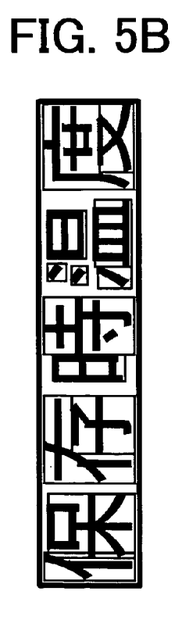
FIG. 5B is an illustration of an example vertical character line extracted from a document image having a horizontal character line rotated by 270 degrees from the upright position.
Figure 5C:
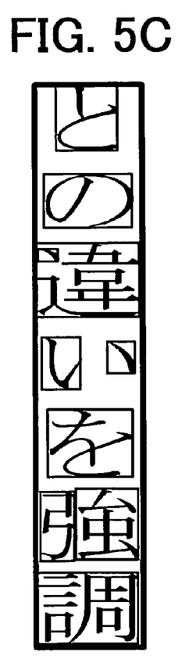
FIG. 5C is an illustration of an example vertical character line extracted from a document image having a vertical character line rotated by 0 degree from the upright position.
Figure 5D:
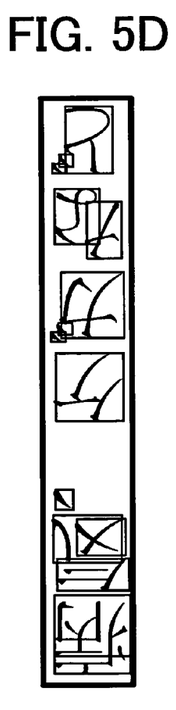
FIG. 5D is an illustration of an example vertical character line extracted from a document image having a vertical character line rotated by 180 degrees from the upright position.

In another example, if the circumscribed rectangles are formed into a vertical character line, four kinds of orientations may be assumed for the characters in the extracted character line, as illustrated in FIGS. 5A to 5D. As shown in FIG. 5A, the extracted vertical character line may contain a plurality of characters having an orientation of 90 degrees from the upright position, which originally belongs to a horizontal character line ("HL 90"). As shown in FIG. 5B, the extracted vertical character line may contain a plurality of characters having an orientation of 270 degrees from the upright position, which originally belongs to a horizontal character line ("HL 270"). As shown in FIG. 5C, the extracted vertical character line may contain a plurality of characters having an orientation of 0 degree from the upright position, which originally belongs to a vertical character line ("VL 0"). As shown in FIG. 5D, the extracted vertical character line may contain a plurality of characters having an orientation of 180 degrees from the upright position, which originally belongs to a vertical character line ("VL 180").

In this example, the orientation of characters in a character line or document image is measured clockwise from the upright position of the character line or document image. However, the orientation may also be measured counterclockwise.

Further, a number of the types of the character line may differ depending on the type of language used in the characters. For example, the characters from the Latin language, such as the English language, are only formed into a horizontal character line. Accordingly, the example cases shown in FIGS. 4C, 4D, 5C, and 5D are not considered.

Furthermore, any number of orientations other than the above-described orientations shown in FIGS. 4A, 4B, 4C, 4D, 5A, 5B, 5C, and 5B may be considered. For example, the degree may not be a multiple of 90. In another example, an inversed orientation, which indicates an example case in which a character line is extracted from a mirror image of the document image, may be considered as described below referring to FIG. 15.

Furthermore, instead of extracting from the entire document image, the plurality of character lines may be extracted from a portion of the document image in Step S2.

Step S3 selects one of the character lines formed in Step S2.

Step S4 detects an orientation of characters in the selected character line using at least one kind of the trained data stored in the NVRAM 5.

Steps S3 and S4 are performed for each of the character lines formed in Step S2. Accordingly, a detection result indicating an orientation of characters in the character line is generated for each of the character lines.

Step S5 analyzes the detection results of the character lines in the document image.

Step S6 determines an orientation of the characters in the document image based on the analysis made by Step S5.

Figure 6:
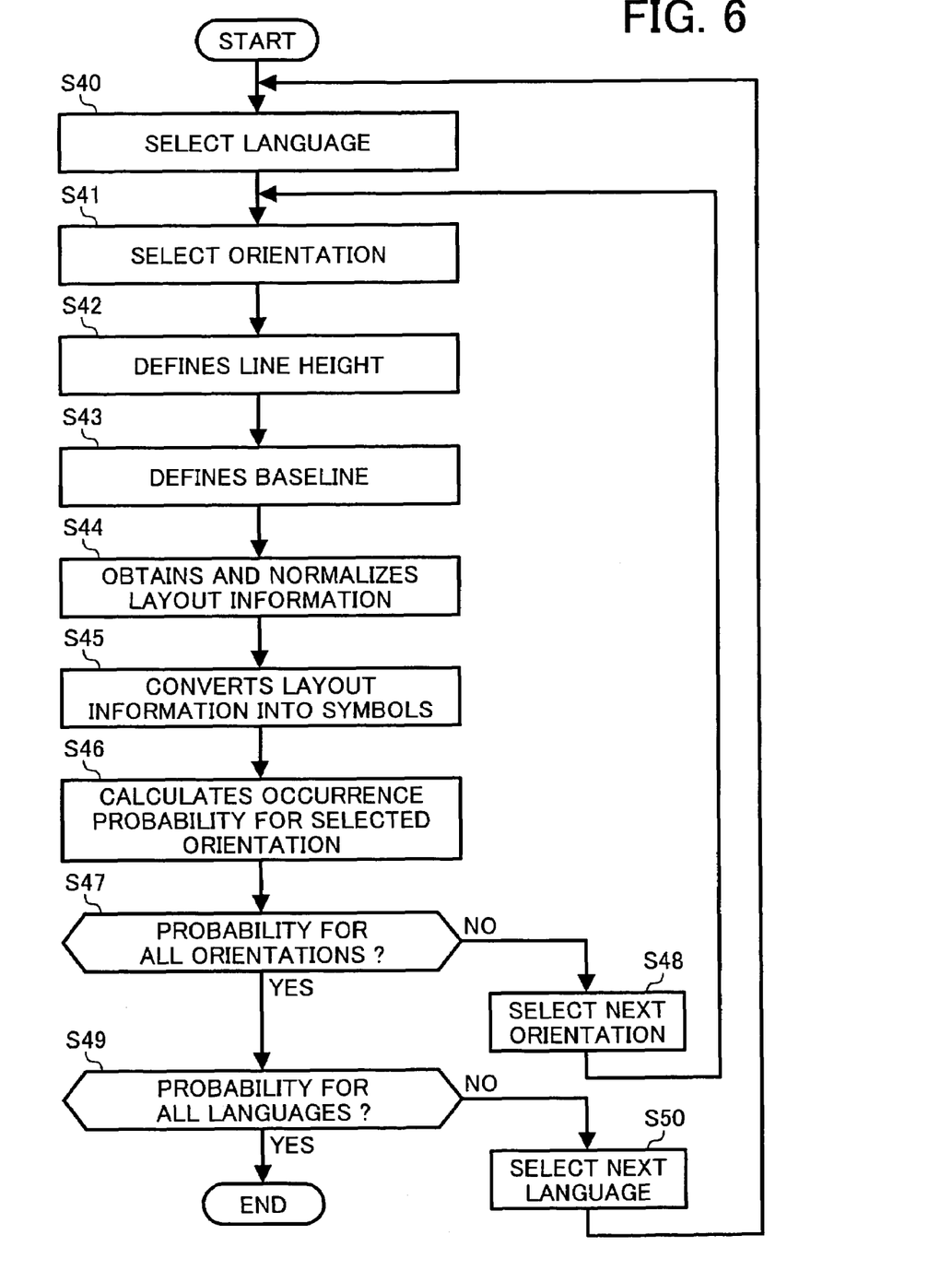
FIG. 6 is a flowchart illustrating operation of detecting an orientation of characters in a character line according to an exemplary embodiment of the present invention.

Referring now to FIG. 6, operation of detecting an orientation of characters in a character line is explained according to an exemplary embodiment of the present invention. The steps illustrated in FIG. 6 are performed in Step S4 of FIGS. 2 and 3 after the CPU 1 selects one of the character lines.

Step S40 selects a language type to be firstly considered. In this example, the Asian language is firstly considered.

Step S41 selects an orientation to be firstly considered. In this example, the character line to be processed is assumed to have a plurality of characters having the orientation of 0 degree from the upright position ("HL0" or "VL0"). Thus, the orientation of 0 degree is selected by default.

Step S42 defines a height of the character line based on the heights of the circumscribed rectangles in the character line.

Figure 7:
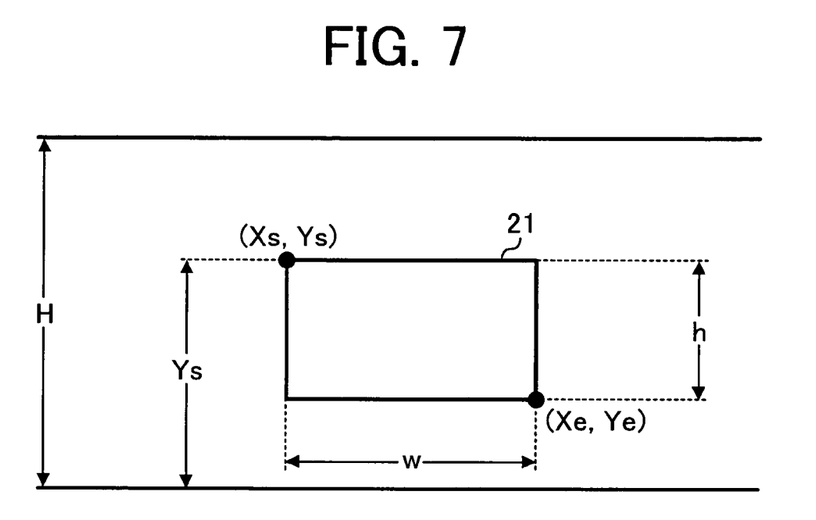
FIG. 7 is an illustration of an example circumscribed rectangle in a character line.

For example, as illustrated in FIG. 7, the height H of the character line is preferably set to be larger than the height h of the circumscribed rectangle 21. The circumscribed rectangle 21 may be any one of the circumscribed rectangles belonging to the character line. As shown in FIG. 7, the circumscribed rectangle 21 may be expressed by a starting point (Xs, Ys) positioned at the upper left corner of the circumscribed rectangle and an ending point (Xe, Ye) positioned at the lower right corner of the circumscribed rectangle. The height h of the circumscribed rectangle 21 may be calculated as the difference (Ys−Ye) in Y coordinates of the starting point and the ending point. By setting the height H of the character line to be larger than the height h of the circumscribed rectangle 21, the characters in the character line may be properly identified, even when the character line contains a small-sized character or even when the characters are skewed.

The height H of the character line may be obtained in various ways. In one example, the height h of a circumscribed rectangle, which is firstly selected, is multiplied by a predetermined constant A. The multiplied height (h*A) is set as a current value of the height H. Similarly, the height h of a circumscribed rectangle, which is secondly selected, is multiplied by the predetermined constant A. The multiplied height (h*A) is then compared with the current value of the height H. If the multiplied height (h*A) is larger than the current value of the height H, the multiplied height (h*A) of the secondly selected circumscribed rectangle is used as a current value of the height H. After performing this operation for each of the circumscribed rectangles in the character line, the height H is set to be larger than the height of any one of the circumscribed rectangles. For example, the predetermined constant A may be set to 1.2.

In another example, the height H of the character line may be calculated using a maximum height hs, which is the largest height value selected from the heights of the circumscribed rectangles in the character line. The maximum height hs is multiplied by a predetermined constant A, and the value of the height H is set to the multiplied height (hs*A).

Step S43 of FIG. 6 defines a baseline of the character line using the Y coordinate value Ye of the ending point of the circumscribed rectangle. In this example, the CPU 1 obtains the values Ye for all of the circumscribed rectangles in the character line, and extracts only the values Ye, which are lower than the half of the defined height H. Based on the extracted values Ye, a regression line is drawn using any one of the known methods. This regression line is used as the baseline of the character line.

Figure 8:
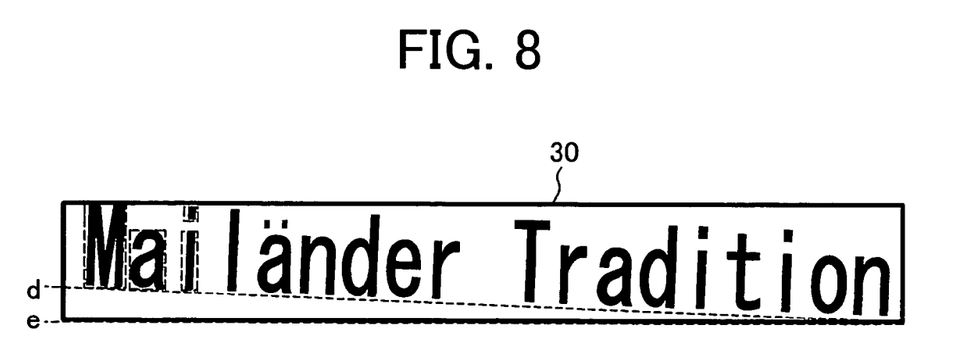
FIG. 8 is an illustration of an example skewed character line.

Instead of drawing the regression line, the baseline may be determined by any other method. For example, the baseline may be determined by drawing a straight line, which passes the ending point of the circumscribed rectangle arranged last in the character line. However, if a skewed character line 30 is extracted as illustrated in FIG. 8, the baseline may be defined incorrectly as indicated by "e" in FIG. 8. The baseline "e" may be adjusted to the baseline "d" by drawing the regression line, which fits the ending points of the circumscribed rectangles in the character line 30.

Referring back to FIG. 6, Step S44 obtains layout information of the circumscribed rectangles in the character line, and normalizes the layout information.

The layout information of the circumscribed rectangles in the character line differs depending on the orientation of the characters in the character line. Further, the layout information varies depending on the language type used in the characters in the character line. In this example, one or more parameters may be extracted from the circumscribed rectangle as the layout information, including the height Ys starting from the baseline, the height h, and the width w, as illustrated in FIG. 7. The layout information is later used to detect the orientation of the characters in the character line.

Figure 9A:
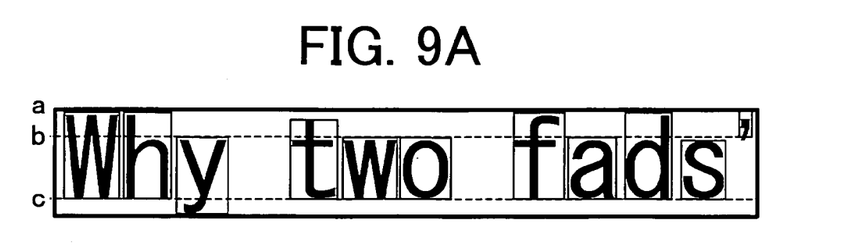
FIG. 9A is an illustration of an example horizontal character line having English characters.
Figure 9B:
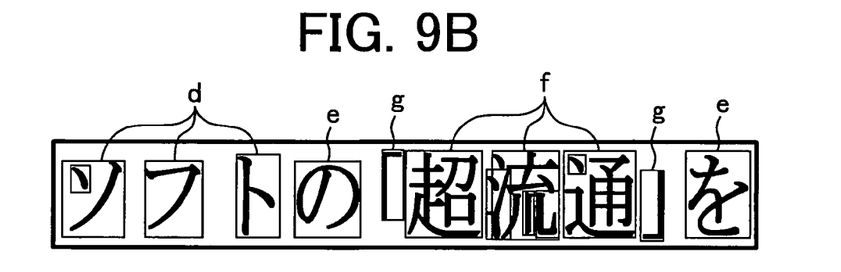
FIG. 9B is an illustration of an example horizontal character line having Japanese characters.

FIGS. 9A and 9B illustrate example cases for explaining how the layout information can be used to detect the orientation of the characters in the character line or the language type used in the characters in the character line.

As shown in FIG. 9A, an English character line mainly includes two types of characters: a capital character (i.e., an upper-case letter) such as "W"; and a small character (i.e., a lower-case letter) such as "h". In addition to these character types, a punctuation mark such as an apostrophe "'" or a period "." may exist.

In the English character line, the heights Ys of the circumscribed rectangles starting from the baseline may be classified into two groups. The capital character has relatively a large height Ys with respect to the baseline as indicated by the "a" in FIG. 9A. The small character has relatively a low height Ys with respect to the baseline as indicated by the "b" in FIG. 9A. Similarly, the heights h of the circumscribed rectangles may be classified into two groups. In FIG. 9A, the characters "W", "h", "y", "t", "f", and "d" have relatively large heights h, while the characters "w", "o", "a", and "s" have relatively small heights h. The widths of the English characters are substantially the same, except for the punctuation marks.

If the characters in the English character line of FIG. 9A are rotated from the upright position, these characteristics that can be expressed by the above-described parameters change. By analyzing the parameters of the circumscribed rectangles, the orientation of the characters in the character line may be detected.

The above-described characteristics may also be common to other Latin languages such as French, Spanish, Italian, German, etc.

As shown in FIG. 9B, a Japanese character line mainly includes three types of characters: a katakana character indicated by the "d", a hiragana character indicated by the "e", and a kanji character indicated by the "f". In addition to these character types, a mark such as quotation mark indicated by the "g" or punctuation mark may exist.

In the Japanese character line, the heights Ys of the circumscribed rectangles starting from the baseline may vary, especially when more than one circumscribed rectangles are formed for one character as illustrated in the kanji character f. Similarly, the heights h or the widths w of the circumscribed rectangles may vary, especially when more than one circumscribed rectangle is formed for one character.

If the characters in the Japanese character line of FIG. 9B are rotated from the upright position, these characteristics that can be expressed by the above-described parameters change. By analyzing the parameters of the circumscribed rectangles, the orientation of the characters in the character line may be detected.

The above-described characteristics may also be common to other Asian languages such as Chinese and Korean.

Once the layout information is obtained for each of the circumscribed rectangles in the character line, the layout information may be normalized to be within a range between 0 and 1. For example, the height Ys is normalized with respect to the height H of the character line to obtain the normalized height YsRate=Ys/H. Similarly, the height h and the width w are normalized with respect to the height H of the character line, respectively, to obtain the normalized height hRate=h/H and the normalized width wRate=w/H.

Referring back to FIG. 6, Step S45 converts the normalized layout information of the character line into a set of symbols.

The characters in the character line are arranged from left to right to form a string. Since each of the characters can be expressed by one or more circumscribed rectangles, and each of the circumscribed rectangles can be expressed by layout information, the character line can be expressed by a time series of layout information. Further, using any one of the known quantizing methods, the time series of layout information can be quantized into a set of discrete symbols.

Figure 10A:
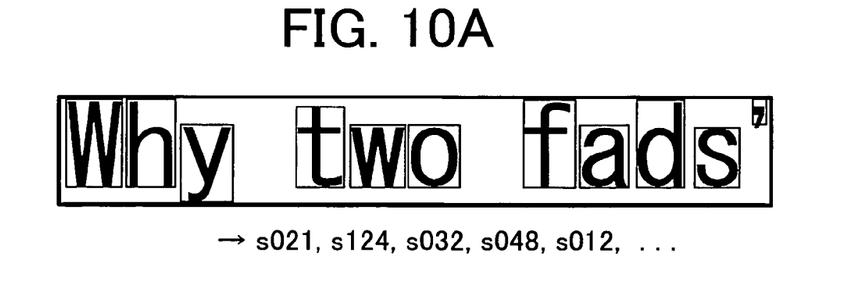
FIG. 10A is an illustration for explaining operation of converting the character line of FIG. 9A to a set of symbols according to an exemplary embodiment of the present invention.
Figure 10B:
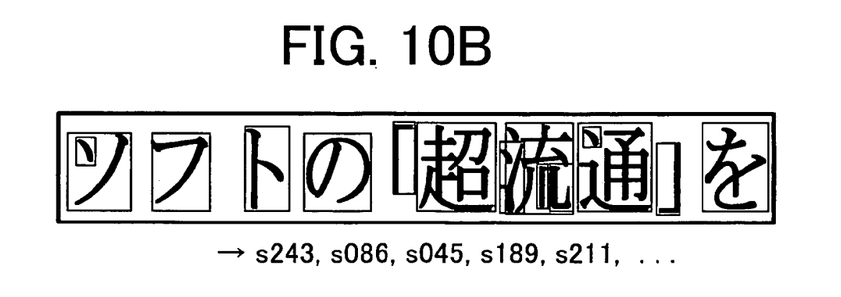
FIG. 10B is an illustration for explaining operation of converting the character line of FIG. 9B to a set of symbols according to an exemplary embodiment of the present invention.

For example, if the normalized height YsRate is obtained as the layout information, the normalized height YsRate can be quantized into a number of integer values as described in the equation: INT (YsRate*(N−1)), wherein N corresponds to a number of quantization levels. In this example, the normalized height YsRate is quanized into 15 levels. Each of the obtained values is further assigned with an ID (identification) label. In this way, as illustrated in FIG. 10A, the English character line of FIG. 9A may be converted to a set of symbols s021, s124, s032, s048, s012, etc., based on the heights Ys of the circumscribed rectangles. Similarly, as illustrated in FIG. 10B, the Japanese character line of FIG. 9B may be converted into a set of symbols s243, s086, s045, s189, s211, etc., based on the heights Ys of the circumscribed rectangles.

In another example, if the normalized height hRate is obtained as the layout information, the normalized height hRate can be quantized into a number of integer values as described in the equation: INT (hRate*(N−1)), wherein N corresponds to a number of quantization levels. In this example, the normalized height hRate may be quantized into eight levels. Additionally, each of the obtained values is further assigned with an ID label.

In yet another example, if the normalized width wRate is obtained as the layout information, the normalized width wRate can be quantized into a number of integer values as described in the equation: INT (wRate*(N−1)), wherein N corresponds to a number of quantization levels. In this example, the normalized width wRate may be quantized into two levels. Additionally, each of the obtained values is further assigned with an ID label.

Alternatively, any combination including the above-described parameters YsRate, hRate, and wRate may be used for quantizing. For example, the character line can be expressed by a time series of three-dimensional vectors, which is defined by the parameters YsRate, hRate, and wRate. Using any one of the known vector quantizing methods, the time series of three-dimensional vectors can be quantized into a set of symbols, which can be expressed in one dimension. In this example, the normalized height YsRate, the normalized height hRate, and the normalized width wRate are quantized respectively into 15 levels, 8 levels, and 2 levels. The quantized layout information is further assigned with an ID level selected from 240 ID levels.

Figure 11:
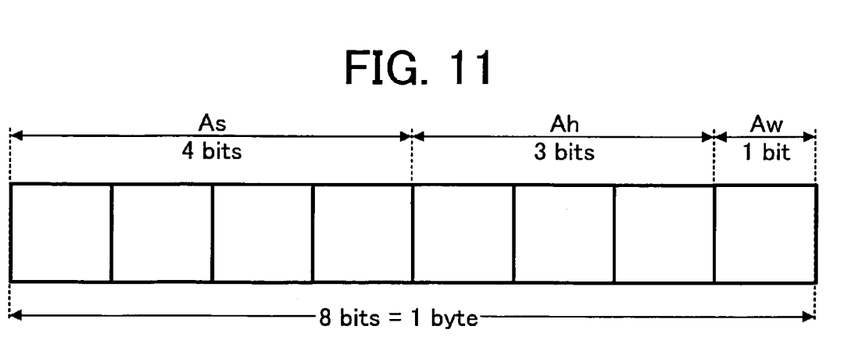
FIG. 11 is an illustration of an example structure of data including a set of symbols.

Further, the quantized layout information can be expressed by 8-bit data, i.e., 1 byte data, as illustrated in FIG. 11. As shown in FIG. 11, the normalized height YsRate is stored as 4-bit data in a data area As. The normalized height hRate is stored as 3-bit data in a data area Ah. The normalized width wRate is stored as 1-bit data in a data area Aw.

Referring back to FIG. 6, Step S46 calculates occurrence probability of the set of symbols for the language selected in Step S40 and the orientation selected in Step S41, using at least one kind of the trained data stored in the NVRAM 5.

In this example, the NVRAM 5 stores three kinds of n-gram models as trained data. The first kind of n-gram models is trained on the characters in the horizontal character line extracted from the Asian reference document image placed in the upright position. The second kind of n-gram models is trained on the characters in the vertical character line extracted from the Asian reference document image placed in the upright position. The third kind of n-gram models is trained on the characters in the horizontal character line extracted from the Latin reference document image. Further, in this example, a trigram model is used as the n-gram model for detecting an orientation of the characters.

First, the CPU 1 obtains one of the trigram models to be used for detecting an orientation of the characters in the character line. In this example, since the Asian language is selected in Step S40, the CPU 1 obtains the first and second kind of the trigram models, which are both trained on the Asian reference document image. Further, this example assumes that the horizontal character line has been extracted in the previous step. Accordingly, the trigram model for the horizontal character line of the Asian reference document image is firstly selected.

Figure 12:
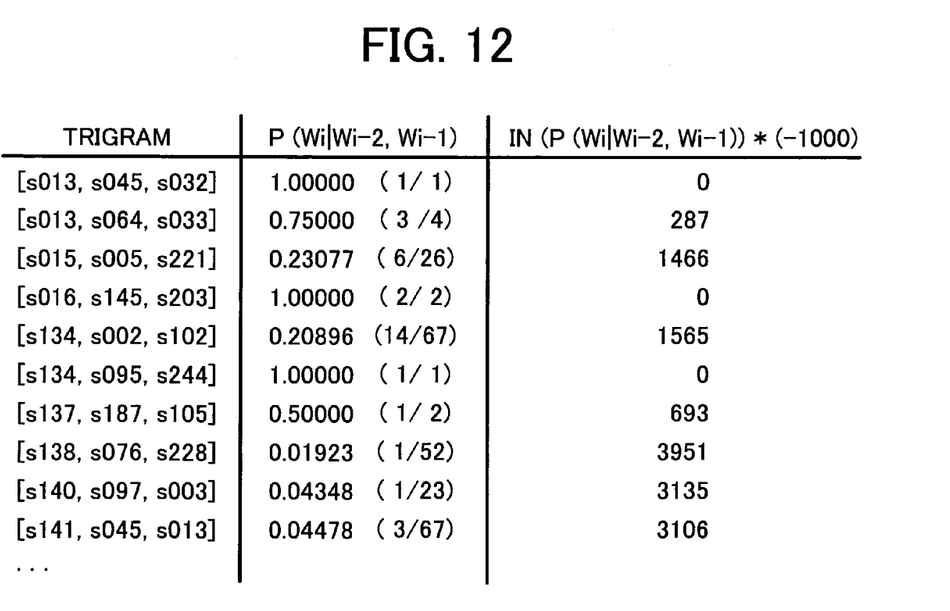
FIG. 12 is an illustration of an example trigram table stored in the image processing apparatus of FIG. 1.

As described above referring to FIG. 1, the trigram model is stored in the NVRAM 5, for example, in the form of a table shown in FIG. 12. Referring to FIG. 12, the n-gram model may be used to obtain the occurrence probability P(W) of which a symbol Wi follows the symbols Wi−2 and Wi−1 as expressed by the equation: P(W)=n(i=1, n) P(Wi|Wi−2, Wi−1). Further, in this example, the occurrence probability is converted to an integer value by multiplying the log of the occurrence probability with −1000 to facilitate computation. This integer value is obtained for each one of a plurality of three consecutive characters in the character line. The sum of the obtained integer values may be used as a score, which indicates the degree of similarity between the character line having the selected orientation and a horizontal character line of the n-gram model having the upright position. More specifically, the character line being processed may look like the example case of "HL0" shown in FIG. 4A, if the score is low. In this manner, the orientation of the characters in the character line can be detected.

Step S47 of FIG. 6 determines whether the probability, i.e., the score, has been calculated for all possible orientations for the selected language. If all possible orientations have been considered ("YES" in Step S47), the operation proceeds to Step S49. If all possible orientations have not been considered ("NO" in Step S47), the operation proceeds to Step S48.

Step S48 selects a next orientation, which is considered next.

For example, if the orientation of 0 degree is firstly considered for the characters in the horizontal character line, the CPU 1 causes the character line being processed to rotate by 90 degrees from the upright position. The CPU 1 then selects one of the trigram models corresponding to the vertical character line of the reference document image having the orientation of 0 degree from the upright position. Using the selected trigram model, the CPU 1 calculates a score, which indicates the degree of similarity between the character line having the selected orientation, i.e., the orientation of 90 degrees, and a vertical character line of the n-gram model having the upright position in a substantially similar manner as describe above referring to Steps S42 to S46. More specifically, the character line being processed may look like the example case of "VL270" shown in FIG. 4D, if the score is low. The score may be stored in the NVRAM 5 for further use.

Similarly, after considering the orientation of 90 degrees, the CPU 1 may cause the character line, which has the orientation of 90 degrees, to rotate by 90 degrees. Alternatively, the CPU 1 may cause the character line, which has the orientation of 0 degree, to rotate by 180 degrees from the upright position. The CPU 1 then selects the trigram model corresponding to the horizontal character line of the reference document image having the orientation of 0 degree. Using the selected trigram model, the CPU 1 calculates a score, which indicates the degree of similarity between the character line having the selected orientation, i.e., the orientation of 180 degrees, and a horizontal character line of the n-gram model having the upright position in a substantially similar manner as described referring to Steps S42 to S46. More specifically, the character line being processed may look like the example case of "HL180" shown in FIG. 4B, if the score is low. The score may be stored in the NVRAM 5 for further use.

Similarly, after considering the orientation of 180 degrees, the CPU 1 may cause the character line, which has the orientation of 180 degrees, to rotate by 90 degrees. Alternatively, the CPU 1 may cause the character line, which has the orientation of 0 degree, to rotate by 270 degrees from the upright position. The CPU 1 then selects the trigram model corresponding to the vertical character line of the reference document image having the orientation of 0 degree. Using the selected trigram model, the CPU 1 calculates a score, which indicates the degree of similarity between the character line having the selected orienaton, the orientation of 270 degrees, with a vertical character line of the n-gram model having the upright position in a substantially similar manner as described referring to Steps S42 to S46. More specifically, the character line being processed may look like the example case of "VL90" shown in FIG. 4C, if the score is low. The score may be stored in the NVRAM 5 for further use.

In this example, the CPU 1 changes the orientation of the characters in the character line using a trigonometric function. For example, a new coordinate (rx, ry) obtained by rotating an original coordinate (x, y) by θ degrees can be obtained by the following functions:

$rx = \cos\theta * x + \sin\theta * y;$ and $ry = -\sin\theta * x + \cos\theta * y.$ However, if the orientation of the characters to be considered is limited to a multiple of 90 degrees such as 0, 90, 180 or 270 degrees, both of the values cos θ and sin θ would be fixed. Thus, the above-described trigonometric function may be further simplified.

Referring back to FIG. 6, Step S49 determines whether the possible orientations have been considered for all language types. If all language types have been considered ("YES" in Step S49), the operation ends. If all language types have not been considered ("NO" in Step S49), the operation proceeds to Step S50.

Step S50 selects a next language type. In this example, the Latin language is selected for further processing. In this manner, the probabilities, i.e., the scores, can be calculated for a predetermined number of orientations for each one of the Asian and Latin language types.

The CPU 1 then selects one of the orientations having the largest value of occurrence probability, i.e., the smallest value of the score. For example, referring to FIG. 3, since the orientation "HL0" has the lowest score of 23098, the CPU 1 determines that the orientation of the extracted horizontal character line is 0 degree.

The operation of FIG. 6 may be performed in various other ways.

In one example, any kind of n-gram model other than the trigram model may be used as trained data, such as a bi-gram model.

In another example, the CPU 1 may first detect the language type of the character line using the layout information before Step S40, and selects the detected language type in Step S40. For example, the number of black pixels present in the circumscribed rectangles, i.e., the density of the black pixels of the circumscribed rectangles, may be used for detecting the language type. As illustrated in FIGS. 9A and 9B, the density of black pixels tends to be relatively low in the English character line, while the density of black pixels tends to be relatively high in the Japanese character line. Thus, the density of black pixels may facilitate an operation of detecting the language type of the character line, which may be performed before Step S40. Once the language type is specified, the occurrence probability, or the score, needs to be calculated only for the detected language type. Accordingly, Steps S40, S49 and S50 may not be performed.

Further, the language type may be previously set depending on the contents of the document image. For example, if the document image contains only Japanese characters, any one of Steps S40, S49, and S50 may not be performed. Information regarding the contents of the document image, such as the language used in the document image, may be previously obtained from a user via the input device 6 of FIG. 1.

In another example, any number of orientations may be considered according to the layout information or user's preferences. For example, only the orientations of 0 and 180 degrees may be considered to reduce computation load. Further, any orientations other than the above-described orientations including 0, 90, 180, and 270 degrees may be considered using the trigonometric function.

Figure 15:
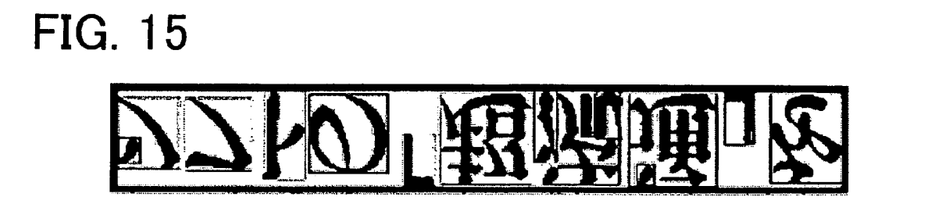
FIG. 15 is an illustration of an example horizontal character line extracted from a mirror document image.

Furthermore, as illustrated in FIG. 15, the character line may have been extracted from a mirror document image, which is generated by alternating the scanning and sub-scanning directions at the time of scanning a document image, if a hand scanner is used. Specifically, the character line shown in FIG. 15 corresponds to a mirror image of the character line shown in FIG. 4A. The probability of which the extracted character line corresponds to a character line extracted from a mirror document image may be obtained by applying affine transformation to the n-gram model generated based on the reference document image having the orientation of 0 degree.

In another example, any other kind of parameters may be extracted from the circumscribed rectangle as layout information in addition or alternative to the parameters including the height Ys, the height h, and the width w of the circumscribed rectangles.

For example, a parameter of the circumscribed rectangle indicating the relationship with other circumscribed rectangles in the character line may be extracted, such as a distance to the adjacent circumscribed rectangle. This is because the distance of the two adjacent characters differs for each of the language types. For example, as illustrated in FIG. 9A, the English character line contains relatively a large number of spaces, each space corresponding to the standard size of the circumscribed rectangle. As illustrated in FIG. 9B, the Japanese character line contains relatively a small number of spaces. Further, as illustrated in FIG. 9A, the apostrophe may generate a space at a lower portion of the English character line. Thus, by analyzing the distances of the circumscribed rectangles in the character line, the orientation of the character line may be detected.

Figure 13:
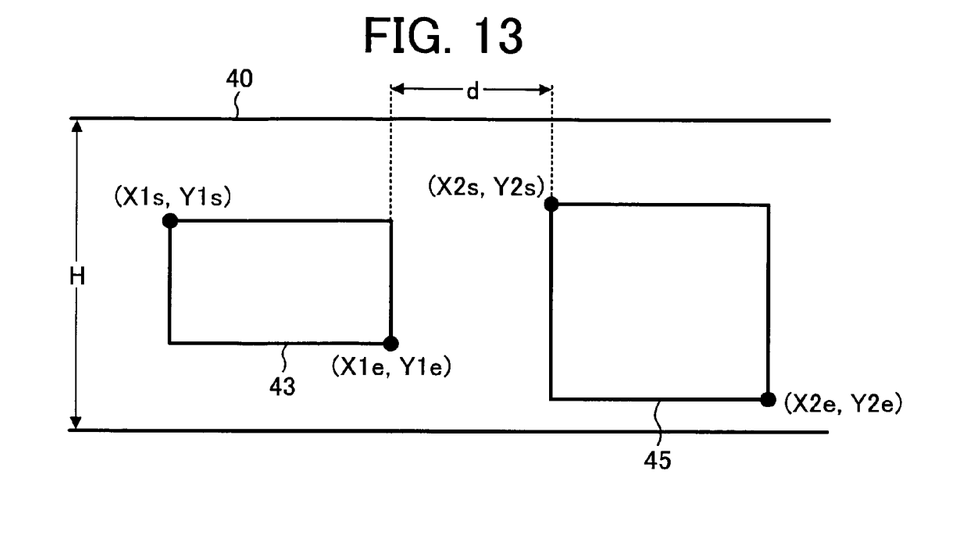
FIG. 13 is an illustration of example circumscribed rectangles adjacent to each other.

Referring to FIG. 13, the distance d with respect to the circumscribed rectangle 45, which is arranged right of the circumscribed rectangle 43, may be extracted as the layout information. The distance d may be obtained as the difference ($X2s-X1e$) between the X coordinate $X2s$ of the starting point of the adjacent circumscribed rectangle 45 and the X coordinate $X1e$ of the ending point of the circumscribed rectangle 43. In this example, the distance d is assumed to have a value larger than 0. However, the distance d may have a negative value in some cases including the case in which two adjacent circumscribed rectangles are overlapped in the horizontal direction, i.e., the X axis.

The distance d of the circumscribed rectangle may be normalized with respect to the height H of the character line to obtain the normalized distance $dRate=d/H$. The normalized distance dRate can be quantized into a number of integer values as described in the equation: $INT((dRate*(N-1))+B)$, wherein N corresponds to a number of quantization levels and B corresponds to a predetermined constant. Each of the obtained values is further assigned with an ID label.

Figure 14:
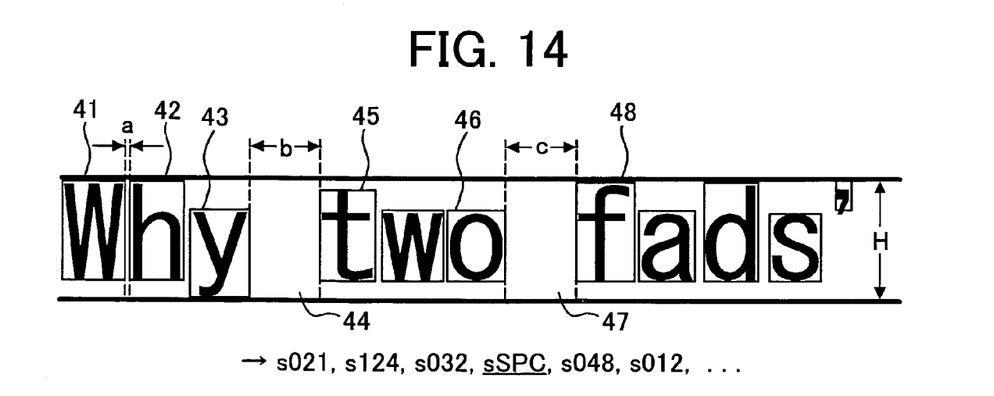
FIG. 14 is an illustration for explaining operation of converting the character line of FIG. 9A to a set of symbols according to an exemplary embodiment of the present invention.

As illustrated in FIG. 14, the space contained in the English character line of FIG. 9A may be converted to a symbol sSPC based on the distance d of the circumscribed rectangle. In FIG. 14, the distance a between the characters 41 and 42 is not converted into a symbol, as it has a value smaller than a predetermined value defined by the constant B. For example, if the predetermined value is set to 0.25, the distance "a" having a value smaller than 0.25 is not converted into a symbol. The distance "b" between the characters 43 and 45, and the distance "c" between the characters 46 and 48, each having a value larger than 0.25, are converted, respectively, to the symbols sSPC.

Further, in this example, more than one symbol sSPC may be assigned to the space in the character line, depending on the value of the distance d. For example, if the distance d value has a negative value, a symbol different from the symbol sSPC may be assigned to the space having the distance d.

Furthermore, as described above, the distance d may be combined with any number of the above-described parameters. For example, the character line can be expressed by a time series of four dimensional vectors, which is defined by the parameters YsRate, hRate, wRate, and dRate. Further, the layout information defined by these parameters can be expressed by 8-bit data as illustrated in FIG. 11. Since 240 symbols can be assigned for the parameters including YsRate, hRate, and wRate, 16 symbols can be assigned for the parameter dRate.

In another example, instead of using the occurrence probability alone, the CPU 1 may use other parameters for determining the orientation of the characters in the character line.

For example, in some cases, the largest value of occurrence probability may be larger than a second largest value of occurrence probability by only a small amount. For improved accuracy, the CPU 1 may determine whether the largest value of occurrence probability is larger by a predetermined amount than the second largest value of occurrence probability. If the largest value is larger by the predetermined amount, the CPU 1 will select the orientation having the largest value of occurrence probability, as the orientation of the characters in the character line. If the largest value is not large enough, the CPU 1 may determine that the orientation of the characters in the character line is undetectable.

Referring back to FIG. 2, once the orientation of the characters is detected for all of the character lines extracted in Step S2 of FIGS. 2 and 3, the CPU 1 analyzes the detection results (Step S5), and determines an orientation of the document image based on the analysis (Step S6).

For example, the CPU 1 may analyze the detection results obtained in Step S4 as a table shown in FIG. 3. The table of FIG. 3 lists a number of character lines in the document image in a corresponding manner with the detected orientations including VL0, VL90, VL180, VL270, HL0, HL90, HL180, and HL270.

In one example, the CPU 1 may select the orientation having a largest number of the character lines as the orientation of the document image. Referring to FIG. 3, the orientation HL0 having the largest number of 68 would be selected.

However, in some example cases, the largest number of the character lines may be larger than a second largest number of the character line by only a small amount. For example, the orientation of the Asian character line may not be properly detected if one circumscribed rectangle is extracted for each of the characters, which is substantially symmetric in four directions (up, bottom, left, and right). In another example, the horizontal or vertical direction of the character line may be determined incorrectly in Step S2, depending on the distance between the two adjacent characters in the character line.

For improved accuracy, the CPU 1 may determine whether the largest number of the character lines is larger by a predetermined amount than the second largest number of the character lines. If the largest number is larger by the predetermined amount, the CPU 1 will select the orientation having the largest number as the orientation of the document image. If the largest number is not large enough, the CPU 1 may determine that the orientation of the document image is undetectable.

In another example, the CPU 1 may consider the number of characters contained in each of the character lines. By selecting the character line having a relatively large number of characters, the accuracy may be improved.

In yet another example, the character line having a length smaller than a predetermined length may not be considered for improved accuracy.

In yet another example, the character line having a height, which occurs most frequently in the document image, may be considered for improved accuracy.

After determining the orientation of the document image, the CPU 1 may further correct the orientation of the document image if the determined orientation does not correspond to the upright position, using any one of the known methods. The document image having the right orientation may be further stored in the HDD 3, or displayed by the display device 7. Alternatively, the document image having the right orientation may be printed out using a printer, which may be incorporated or coupled to the image processing apparatus 100.

Numerous additional modifications and variations are additionally possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Figure 16:
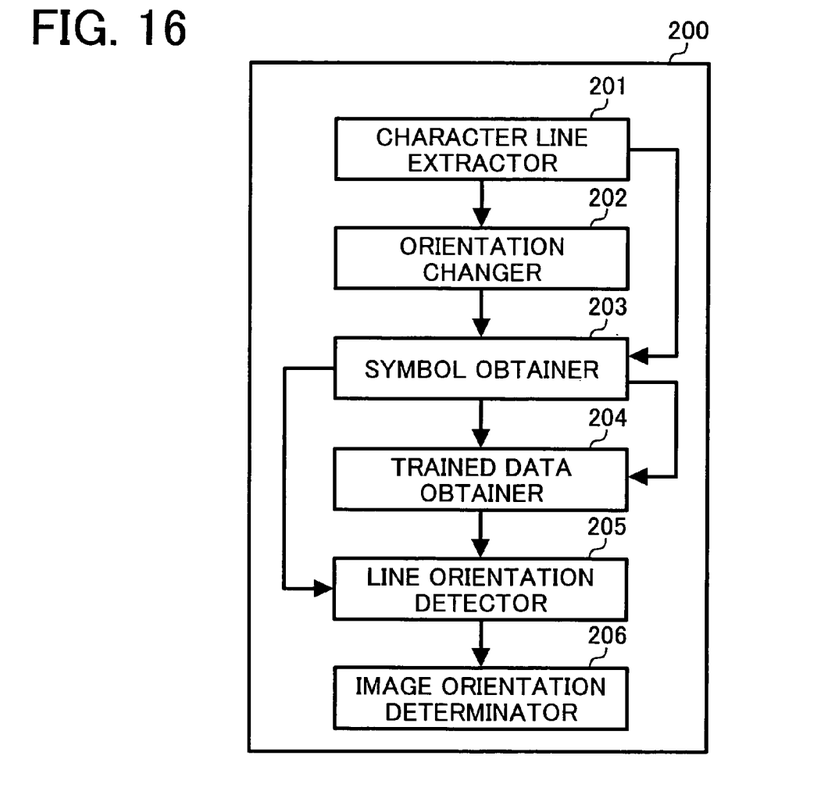
FIG. 16 is a schematic block diagram illustrating the functional structure of an image processing apparatus according to an exemplary embodiment of the present invention.

Furthermore, the structure of the image processing apparatus 100 may not be limited to the structure shown in FIG. 1 as long as the functions described referring to FIG. 16 are performed.

As shown in FIG. 16, an image processing apparatus 200 includes a character line extractor 201, an orientation changer 202, a symbol obtainer 203, a trained data obtainer 204, a line orientation detector 205, and an image orientation determinator 206.

The character line extractor 201 receives an input document image having a plurality of characters. The character line extractor 201 then extracts a character line from a portion or the entire document image. In this example, the character line may be expressed by a plurality of circumscribed rectangles, each of which is generated based on at least one character in the character line. Since the character line is formed based on the plurality of circumscribed rectangles, the character line may be extracted even from a compressed document image having a low resolution.

The orientation changer 202 causes the character line to have a selected orientation by rotating the character line by a predetermined degree. The predetermined degree may be a multiple of 90, such as 0, 90, 180, and 270. Further, the orientation of the character line may be changed using a trigonometric function. Furthermore, the selected orientation may be an inversed orientation, which corresponds to a character line extracted from a mirror image of the input document image.

The symbol obtainer 203 converts the character line having the selected orientation to a first set of symbols. For example, layout information may be obtained from the circumscribed rectangles in the character line. In this example, the layout information corresponds to at least one or any combination of a plurality of parameters including a height of the circumscribe rectangle starting from the baseline of the character line, a height of the circumscribed rectangle, a width of the circumscribed rectangle, a distance of the circumscribed rectangle with respect to one of the circumscribed rectangles arranged adjacent to the circumscribed rectangle, a number of black pixels contained in the circumscribed rectangle, etc. The layout information is then converted into a first set of symbols.

The trained data obtainer 204 obtains trained data, which is generated based on a reference document image having an upright position. In this example, the character line extractor 201 previously extracts two kinds of character lines from one or more reference document images: one kind corresponding to a horizontal character line; and the other kind corresponding to a vertical character line. The character line, i.e., the horizontal or vertical character line, is then converted to a second set of symbols using the symbol obtainer 203. The statistical tendency of the second set of symbols, such as the occurrence probability expressed by an n-gram model, is then calculated and stored as the trained data. Accordingly, the trained data at least includes a first kind of trained data trained on a horizontal character line extracted from the reference document image, and a second kind of trained data trained on a vertical character line extracted from the reference document image.

The line orientation detector 205 detects the degree of similarity between the character line having the selected orientation and the trained data of the upright position to generate a detection result.

For example, the line orientation detector 205 obtains the occurrence probability of the character line having the selected orientation using the trained data of the upright position. The occurrence probability may be stored as a score for further use. Further, in this example, the trained data used for detecting may be switched depending on the character line being processed. For example, the first kind and the second kind of trained data may be switched depending on the selected orientation of the character line.

The image orientation determinator 206 determines an orientation of the pluratliy of characters in the input document image based on the detection result, to generate a determination result.

In addition to the elements described above, the image processing apparatus 200 of FIG. 16 may include an image orientation corrector, which corrects the orientation of the input document image to the upright position based on the determination result. Alternatively, the orientation of the input document image may be adjusted by the orientation changer 202.

Figure 17:
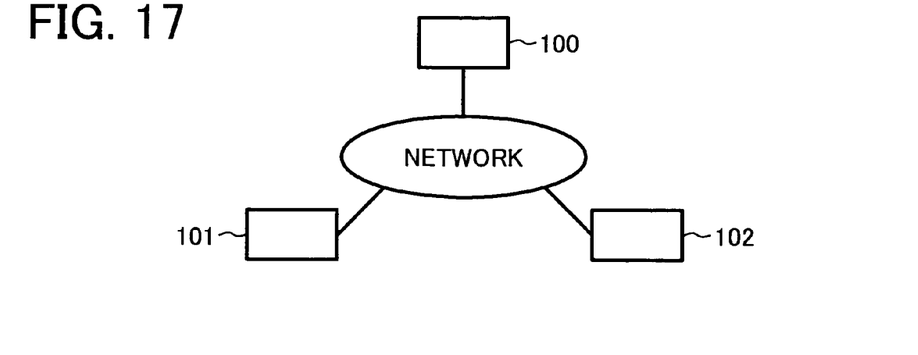
FIG. 17 is a schematic block diagram illustrating the structure of an image processing system according to an exemplary embodiment of the present invention.

Furthermore, any one of the above-described and other functions or methods of the present invention may be performed by an image processing system having one or more apparatuses, as illustrated in FIG. 17.

Referring to FIG. 17, the orientation detecting program may be uploaded to any one of the image processing apparatuses 102 and 103 via the network. Having the program downloaded from the network, any one of the image processing apparatuses 102 and 103 becomes capable of detecting an orientation of characters in a document image in a substantially similar manner as described above.

Furthermore, the above-described and other image processing apparatuses of the present invention may be used in combination with any other apparatus.

Figure 18:
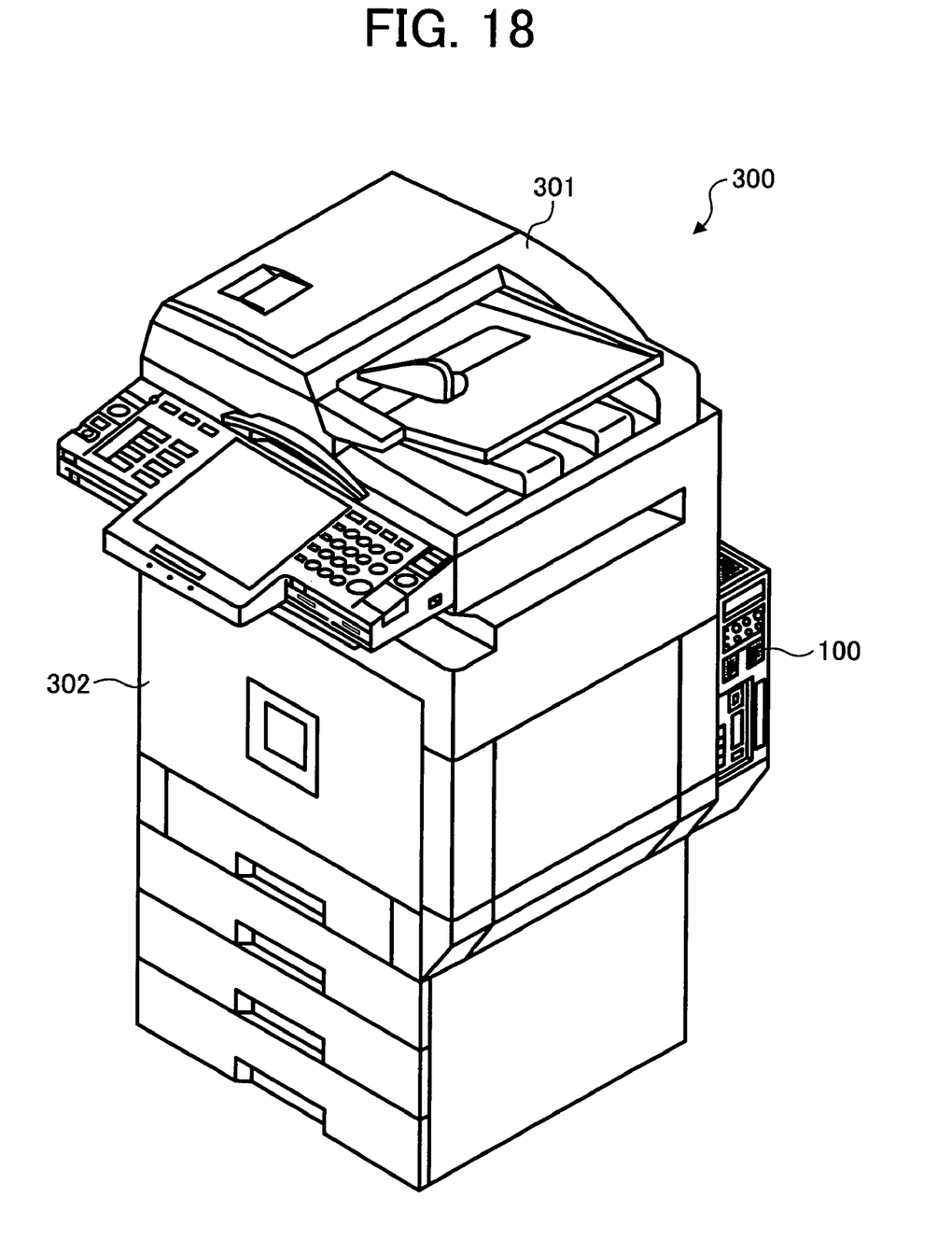
FIG. 18 is a perspective view illustrating the outer appearance of an image forming apparatus incorporating the image processing apparatus of FIG. 1.

For example, as illustrated in FIG. 18, the image processing apparatus 100 of FIG. 1 may be incorporated into an image forming apparatus 300. The image forming apparatus 300 additionally includes a scanner 301 and a printer 302.

In example operation, the scanner 301 scans a document to be processed into an input document image. The image processing apparatus 100 detects an orientation of the input document image, and corrects the orientation to the upright position. The printer 302 prints the input document image having the right orientation as a printed image.

Furthermore, any one of the above-described and other methods of the present invention may be implemented by ASIC prepared by interconnecting an appropriate network of conventional component circuits or by a combination thereof with one or more conventional general purpose microprocessors and/or signal processors programmed accordingly.

This patent application is based on and claims priority to Japanese patent application No. 2005-077879 filed on Mar. 17, 2005, in the Japanese Patent Office, the entire contents of which are hereby incorporated by reference.

The invention claimed is:

1. An image processing apparatus, comprising:
means for extracting a character line from an input document image having a plurality of characters;
means for causing the character line to have a selected orientation by rotating the character line by a predetermined degree;
means for converting the character line having the selected orientation to a first set of symbols;
means for obtaining trained data, which is generated based on a reference document image having an upright position, the trained data being selected from a first kind of trained data trained on a horizontal character line extracted from the reference document image and a second kind of trained data trained on a vertical character line extracted from the reference document image, wherein the trained data is selected based on the character line having the selected orientation;
means for detecting the degree of similarity between the character line having the selected orientation and the trained data of the upright position to generate a detection result; and
means for determining an orientation of the plurality of characters in the input document image based on the detection result.

2. The apparatus of claim 1, wherein the orientation of the character line is changed using a trigonometric function.

3. The apparatus of claim 1, wherein the predetermined degree is a multiple of 90.

4. The apparatus of claim 3, wherein the selected orientation includes an inversed orientation, which corresponds to a character line extracted from a mirror image of the input document image.

5. The apparatus of claim 1, further comprising:
means for inputting the input document image for further processing,
wherein the input document image is a compressed image having a resolution lower than the resolution of the original document image.

6. The apparatus of claim 5, further comprising:
means for correcting an orientation of the input document image to the upright position.

7. The apparatus of claim 6, further comprising:
means for outputting the input document image having the upright position.

8. An image processing method, comprising the steps of:
extracting a character line from an input document image having a plurality of characters;
first selecting an orientation to be considered, wherein the character line is rotated by a predetermined degree to have the selected orientation;
obtaining layout information from the character line;
converting the layout information to a set of symbols;
switching between a first n-gram model generated based on a horizontal character line extracted from a reference document image and a second n-gram model generated based on a vertical character line extracted from a reference document image based on the character line having the selected orientation; and
calculating occurrence probability of the set of symbols using the n-gram model being switched to generate a detection result,
wherein the steps of first selecting, obtaining, converting, and calculating are repeated for a predetermined number of orientations of the character line.

9. The method of claim 8, further comprising the step of:
second selecting a language type to be considered, wherein the selected orientation is determined based on the language type.

10. The method of claim 9, wherein the language type is selected based on the layout information obtained by the converting step.

11. The method of claim 9, wherein the steps of first selecting, second selecting, obtaining, converting, and calculating are repeated for a predetermined number of language types.

12. The method of claim 8, further comprising the step of:
determining an orientation of the input document image based on the detection result, to generate a determination result.

13. The method of claim 12, further comprising the step of:
rotating the input document image to have an orientation corresponding to the upright position based on the determination result.

14. An image processing system, comprising:
a processor;
a storage device configured to store a plurality of instructions which, when activated by the processor, cause the processor to perform at least one of a plurality of functions, the plurality of functions comprising:
extracting a character line from an input document image;
rotating the character line by a predetermined degree to have a selected orientation;
converting the character line having the selected orientation to a first set of symbols;
obtaining a score of the character line having the selected orientation, wherein the score indicates the degree of similarity between the character line having the selected orientation and trained data, the trained data being selected from a first kind of trained data trained on a horizontal character line extracted from a reference document image and a second kind of trained data trained on a vertical character line extracted from a reference document image, wherein the trained data is selected based on the character line having the selected orientation; and
determining an orientation of the input document image based on the score.

15. The system of claim 14, wherein the storage device further stores:
  the first kind of trained data trained on a horizontal character line extracted from a reference document image; and
  the second kind of trained data trained on a vertical character line extracted from a reference document image.

16. A computer readable medium storing computer instructions for performing an image processing operation comprising:
  extracting a character tine from an input document image having a plurality of characters;
  selecting an orientation to be considered from a predetermined number of orientations, wherein the character line is rotated by a predetermined degree to have the selected orientation;
  obtaining layout information from the character line;
  converting the layout information to a set of symbols; and
  calculating occurrence probability of the set of symbols using trained data to generate a detection result, the trained data being selected from a first kind of trained data trained on a horizontal character line extracted from a reference document image and a second kind of trained data trained on a vertical character line extracted from a reference document image, wherein the trained data is selected based on the character line having the selected orientation,
  wherein the steps of selecting, obtaining, converting and calculating are repeated for the predetermined number of orientations.

* * * * *